US012105676B2

(12) United States Patent
Zhao et al.

(10) Patent No.: US 12,105,676 B2
(45) Date of Patent: Oct. 1, 2024

(54) PREDICTION OF FILE INTERACTION BY A USER

(71) Applicant: International Business Machines Corporation, Armonk, NY (US)

(72) Inventors: Jing Zhao, BeiJing (CN); Xiao Yun Wang, Beijing (CN); Si Yu Chen, Beijing (CN); Jiangang Deng, Beijing (CN); Jiang Yi Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 17/809,296

(22) Filed: Jun. 28, 2022

(65) Prior Publication Data
US 2023/0418787 A1 Dec. 28, 2023

(51) Int. Cl.
*G06F 16/00* (2019.01)
*G06F 16/13* (2019.01)
*G06F 16/16* (2019.01)
*G06F 16/17* (2019.01)
*G06F 16/33* (2019.01)

(52) U.S. Cl.
CPC .......... *G06F 16/1734* (2019.01); *G06F 16/13* (2019.01); *G06F 16/164* (2019.01); *G06F 16/3347* (2019.01)

(58) Field of Classification Search
CPC .................................................. G06F 16/3347
See application file for complete search history.

(56) References Cited

U.S. PATENT DOCUMENTS

| 10,275,355 | B2 | 4/2019 | Huang |
| 2020/0104395 | A1* | 4/2020 | Bhatia ................. G06F 16/9024 |

FOREIGN PATENT DOCUMENTS

| CN | 109324983 | A | 2/2019 |
| CN | 105824968 | B | 4/2019 |
| CN | 112800010 | A | 5/2021 |
| CN | 113688000 | A | 11/2021 |
| WO | 2010002185 | A2 | 1/2010 |
| WO | 2021017899 | A1 | 2/2021 |

OTHER PUBLICATIONS

Disclosed Anonymously, "Automated Deletion and Archiving of Source Files in a Software Control Management System", An IP.com Prior Art Database Technical Disclosure, IP.com No. IPCOM000246008D, IP.com Electronic Publication Date: Apr. 26, 2016, 3 pages.

* cited by examiner

*Primary Examiner* — Ajith Jacob
(74) *Attorney, Agent, or Firm* — Lily Neff; Andrew D. Wright; Calderon Safran & Wright P.C.

(57) ABSTRACT

A computer-implemented method, computer program product and computer system to automatically perform file management operations is provided. A processor identifies a plurality of files to monitor. A processor generates tracking attributes for the plurality of files. A processor monitors user interactions with the plurality of files. A processor generates prediction vectors for a plurality of file interactions based on the user interactions with the plurality of files. A processor determines at least one file in the plurality of files with tracking attributes that correlate with at least one prediction vector. A processor performs an operation on the at least one file that corresponds with the at least one prediction vector.

20 Claims, 4 Drawing Sheets

PREDICTION OF FILE INTERACTION BY A USER

BACKGROUND OF THE INVENTION

The present invention relates generally to the field of file management, and more particularly to monitoring user interactions with a file to predict interactions with similar files.

File management refers to the process of organizing, storing, and manipulating files on a computer system. This can include editing files, backing up files, and compressing files to save space. Typically, users must manually interact with each file or create scripts if more than one file is to be edited or interacted with in any way.

SUMMARY

Embodiments of the present invention provide a computer-implemented method, computer program product and computer system to automatically perform file management operations. A processor identifies a plurality of files to monitor. A processor generates tracking attributes for the plurality of files. A processor monitors user interactions with the plurality of files. A processor generates prediction vectors for a plurality of file interactions based on the user interactions with the plurality of files. A processor determines at least one file in the plurality of files with tracking attributes that correlate with at least one prediction vector. A processor performs an operation on the at least one file that corresponds with the at least one prediction vector.

DETAILED DESCRIPTION

Figure 1:
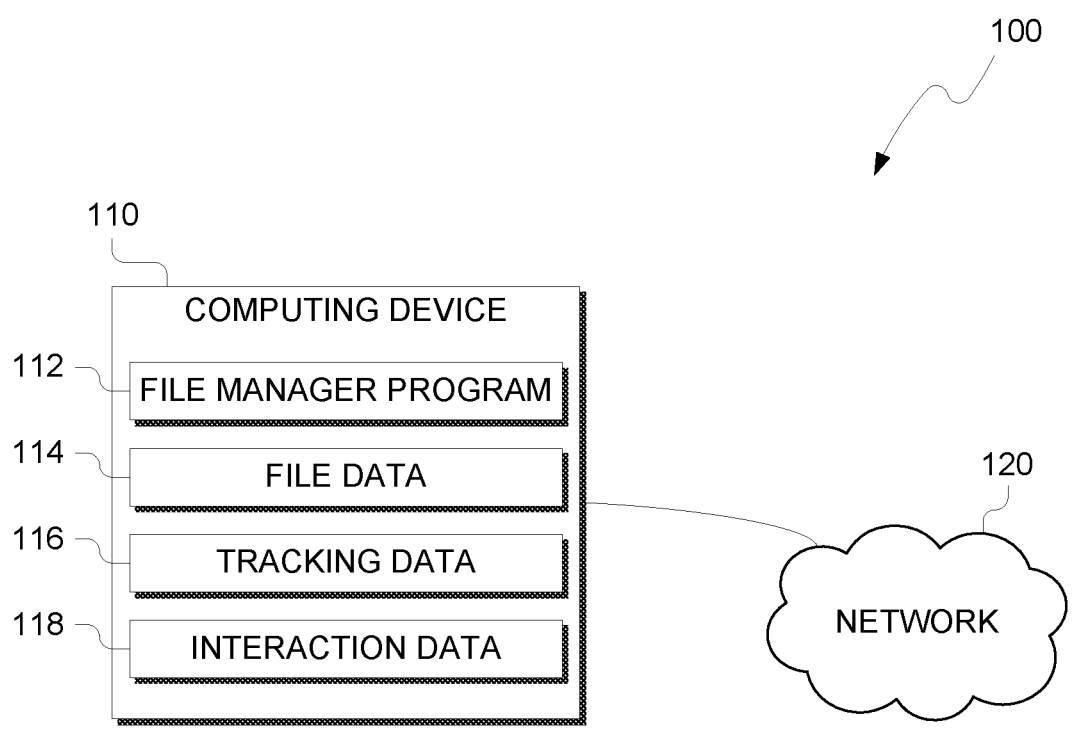
FIG. 1 is a functional block diagram illustrating a computing environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating computing environment, generally designated 100, in accordance with one embodiment of the present invention. Computing environment 100 includes computing device 110 connected to network 120. Computing device 110 includes file manager program 112, file data 114, tracking data 116 and interaction data 118.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to, file data 114, tracking data 116 and interaction data 118 and is capable of executing file manager program 112. Computing device 110 may include internal and external hardware components, as depicted and described in further detail with respect to FIG. 4.

In this exemplary embodiment, file manager program 112, file data 114, tracking data 116 and interaction data 118 are stored on computing device 110. However, in other embodiments, file manager program 112, file data 114, tracking data 116 and interaction data 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices (not shown) connected to network 120, in accordance with a desired embodiment of the present invention.

In various embodiments, file manager program 112 generates and updates various attributes for files, or a collection or set of files, stored on computing device 110. The attributes include typical metadata regarding the files, such as file size and creation date, as well as attributes that record and track various user interactions users have with the files, such as deleting a file or copying a file to another folder or storage location on computing device 110. By tracking user interactions, file manager program 112 generates interaction attribute vectors associated with the different types of interactions that can occur with the files, such as deleing a file, moving a file, or backing up a file. When a user performs an interaction with a file, then file manager program 112 identifies other files that have similar attributes to the interaction attribute vector associated with interaction that just occurred. File manager program 112 then suggests the other files to be manipulated in a similar manner as the observed interaction (i.e., suggest other files to be moved, deleted or backed up). In some scenarios, file manager program 112 may automatically perform maintenance actions to the other files when permitted by the user.

Prior solutions to automated file management require scripts or premade log files, and thereby cannot automatically identify similar files, and must be indicated by the user either as a collection or by simply placing all files in a particular folder. Embodiments of the present invention provide for a solution that can automatically identify files that are predicted to be candidates for a similar action taken by the user on a single file. For example, when a user back's up a file to another storage device, embodiments of the present invention identify files with similar tracking attributes to be backed up as well. By doing so, embodiments of the present invention provide for improvements over other solutions by automating many tasks when interacting with files in a file manager.

In various embodiments, file manager program 112 receives input from a user regarding files to monitor and provide automated maintenance actions or suggestions. In some embodiments, file manager program 112 monitors every file on computing device 110. In other embodiments, file manager program 112 monitors only files or folders indicated by the user. As discussed herein, file data 114 includes any files that are monitored by file manager program 112. In some scenarios, file data 114 may also include folders and files stored on a network drive or cloud-based storage system (not shown) that can be accessed via network 120.

In various embodiments, file manager program 112 generates tracking data 116. Tracking data 116 includes various attributes associated with the files being monitored in file data 114. Tracking data 116 includes a user-provided attribute that indicate if the user permits automated maintenance actions or to keep the file permanently, only altering the file based on direct user input. For permanent files, file manager program 112 will not automatically manipulate, delete, move or otherwise alter the file. For automated files, file manager program 112 may, as discussed herein, automatically manipulate, delete, move or otherwise alter the file.

In various embodiments, tracking data 116 includes metadata regarding the files in file data 114. Typical metadata such as file size, path and last modified time are included in tracking data 116. Additionally, tracking data 116 also includes data that track various user interactions with files in file data 114. Tracking data 116 includes four major categories of interactions: file creation, file associations, file alterations and file access. File creation includes attributes to track how a file was created which includes, but is not limited to, data indicating source program or command that created the file; if the file was downloaded or created locally; and other data indicative of what created a file or where the file was retrieved from. File associations includes attributes to track a file's history of use which includes, but is not limited to, if a file is a copy or derivative of another file and if a file contains a portion or was created based on another file. File alterations includes attributes to track file-level changes to a file which includes, but is not limited to, filename history; compression history; upload history; and other references or links to the file. File access includes attributes to track a file's access history which includes, but is not limited to, previous dates or times a file was open, edited or otherwise viewed or interacted with; and a frequency or rate of access with the file.

In various embodiments, as a user interacts with file data 114, file manager program 112 maintains and updates interaction data 118. Interaction data 118 includes various interaction attribute vectors that are directed towards common interactions that can occur with file data, such as, but not limited to, deleting a file, moving a file, or backing up a file to another storage source or location. As a user performs various interactions to file data 114, file manager program 112 updates the interaction attribute vector associated with each action taken. As more of the same action occurs, file manager program 112 determines if any attributes in tracking data 116 typically co-occur with the interaction. For example, file manager program 112 observes that various delete interactions with file data 114 occurs with files that were downloaded from an external source. In response, file manager program 112 updates the interaction attribute vector for the delete operations to have the "true" value for a "downloaded?" attribute. During tracking, file manager program 112 maintains the various interaction attribute vectors, updating the vectors when new inferences occur.

In various embodiments, file manager program 112 performs various maintenance actions for files that have similar attributes to the interaction attribute vectors, performing the interaction when a file's tracking attributes correlates with an interaction attribute vector. In some scenarios, file manager program 112 performs various maintenance actions automatically in response to storage space restrictions or other predetermined scenarios. In other scenarios, file manager program 112 suggests various maintenance actions when a user performs an action to a file. For example, if a user deletes a file in a folder, then file manager program 112 suggests other similar files in the folder to delete, based on the tracking data 114 for the file matching other files in the folder. In further scenarios, file manager program 112 without user action may provide a notification or message indicating files that have similar attributes to an interaction vector, but are marked permanent, thereby allowing the user to review the maintenance actions prior to being performed.

Figure 2:
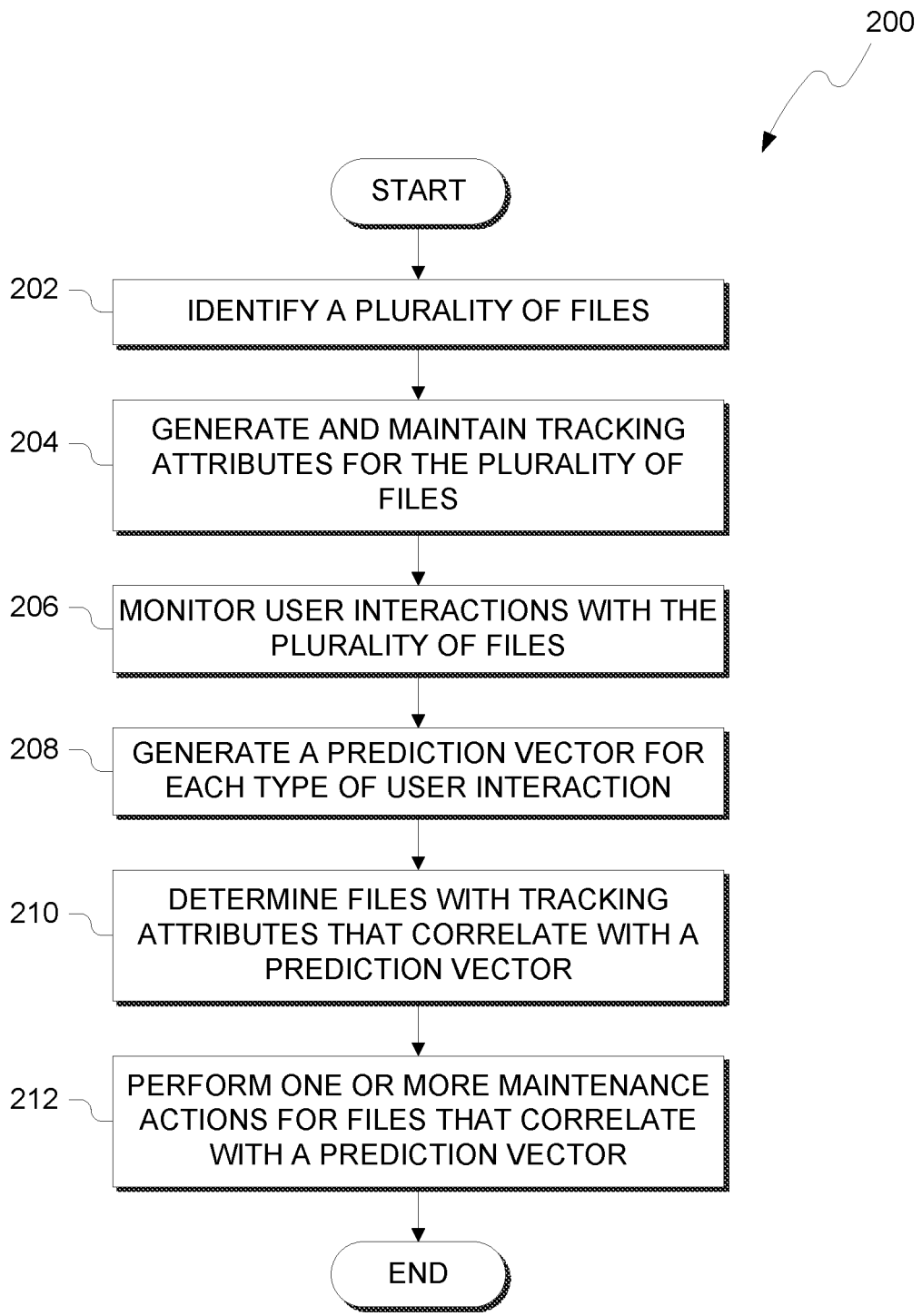
FIG. 2 illustrates operational processes of a file manager program, on a computing device within the environment of FIG. 1, in accordance with an exemplary embodiment of the present invention.

FIG. 2 illustrates operational processes, generally designated as 300, of file manager program 112, on a computing device within the environment of FIG. 1, in accordance with an exemplary embodiment of the present invention. In process 202, file manager program 112 identifies a plurality of files to monitor user action and perform maintenance actions as discussed herein, referred to as file data 114. In some scenarios, file manager program 112 receives from a user an indication of which files, folders or locations to track and monitor. In other scenarios, file manager program 112 may automatically scan for files stored on computing device 110 adding certain files and filetypes, such as user-generated documents such as images, word processing documents and the like.

In process 204, file manager program 112 generates and maintains tracking attributes for the plurality of files monitored in file data 114, as tracking data 116. Tracking data 116 include typical file metadata such as file size, file type and the like, but also includes various attributes directed towards four categories: file creation, file associations, file alterations and file access. In process 206, file manager program 112 monitor user interactions with the plurality of files represented as file data 114. As user perform various interactions with files in file data 114, file manager program 112 retrieves the tracking data 116 attributes associated with the file. For example, if a user moves a file to another folder, then file manager program 112 denotes the interaction type and retrieves the tracking attributes associated with the moved file. Example tracking data 116 attributes include, but are not limited to, origin program/platform, was the file downloaded or locally created, download source, has the file been copied, is the file a copy, has the file been renamed, is the file compressed, has the file been uploaded, how many times has the filed been accessed, and the time since last access.

In process 208, file manager program 112 generates prediction vectors for the type of interaction that occurs. The prediction vectors include expected tracking attributes of files involved in user interactions. For example, anytime a user deletes a file, file manager program 112 updates the prediction vectors associated with file deletion. Each vector includes entries for the various tracking attributes maintained in tracking data 116. When an action occurs to a file, file manager program 112 correlates the attributes of the file to the prediction vector for the action and determines if any attribute has a high degree of correlation with the action occurring.

In process 210, file manager program 112 determines a correlation between the interaction occurring and each attribute in tracking data 116 based on a Chi-square hypothesis test. For example, file manager program 112 tracks a file attribute for "downloaded" in tracking data 116 indicating if the file has been downloaded from networked source or not as true or false. Additionally, file manager program 112 monitors for a "delete" interaction in interaction data 118, where delete interactions with files are recorded and used to determine the delete interaction vector attributes to identify attributes that correlate or are frequently found in files that are deleted. In this example, 209 overall interactions have been observed, both the delete interaction and as well as other file interactions such as moving the file. Of the 209 interactions, 125 have been delete interactions with 94 being other interactions. Of the 125 delete interactions, 48 were downloaded files and 77 were created locally. For the other interactions that are not delete interactions, 51 were interactions with files that were downloaded and 43 that were created locally. As such, the rate of occurrence that downloaded files were deleted occurred for 48.5% (48/(48+51)) file interactions where as local files have a higher rate of occurrence of 70% (77/(77+43)). As such, file manager program 112 determines a correlation between the delete interaction occurring when the downloaded attribute is false. One of ordinary skill in the art will appreciate that other statistical methods may be used to determine a correlation between an interaction and attributes including, but not limited to, Risk Ratio, Odds Ratio, Cluster Analysis, classification models and neural networks.

In process 212, file manager program 112 performs one or more maintenance actions for files that have similar attributes to the interaction attribute vectors, performing the interaction when a file's tracking attributes correlates with an interaction attribute vector. In some scenarios, file manager program 112 performs various maintenance actions automatically in response to storage space restrictions or other predetermined scenarios. In other scenarios, file manager program 112 suggests various maintenance actions when a user performs an action to a file. For example, if a user deletes a file in a folder, then file manager program 112 suggests other similar files in the folder to delete, based on the tracking data 114 for the file matching other files in the folder. In further scenarios, file manager program 112 without user action may provide a notification or message indicating files that have similar attributes to an interaction vector, but are marked permanent, thereby allowing the user to review the maintenance actions prior to being performed.

Figure 3:
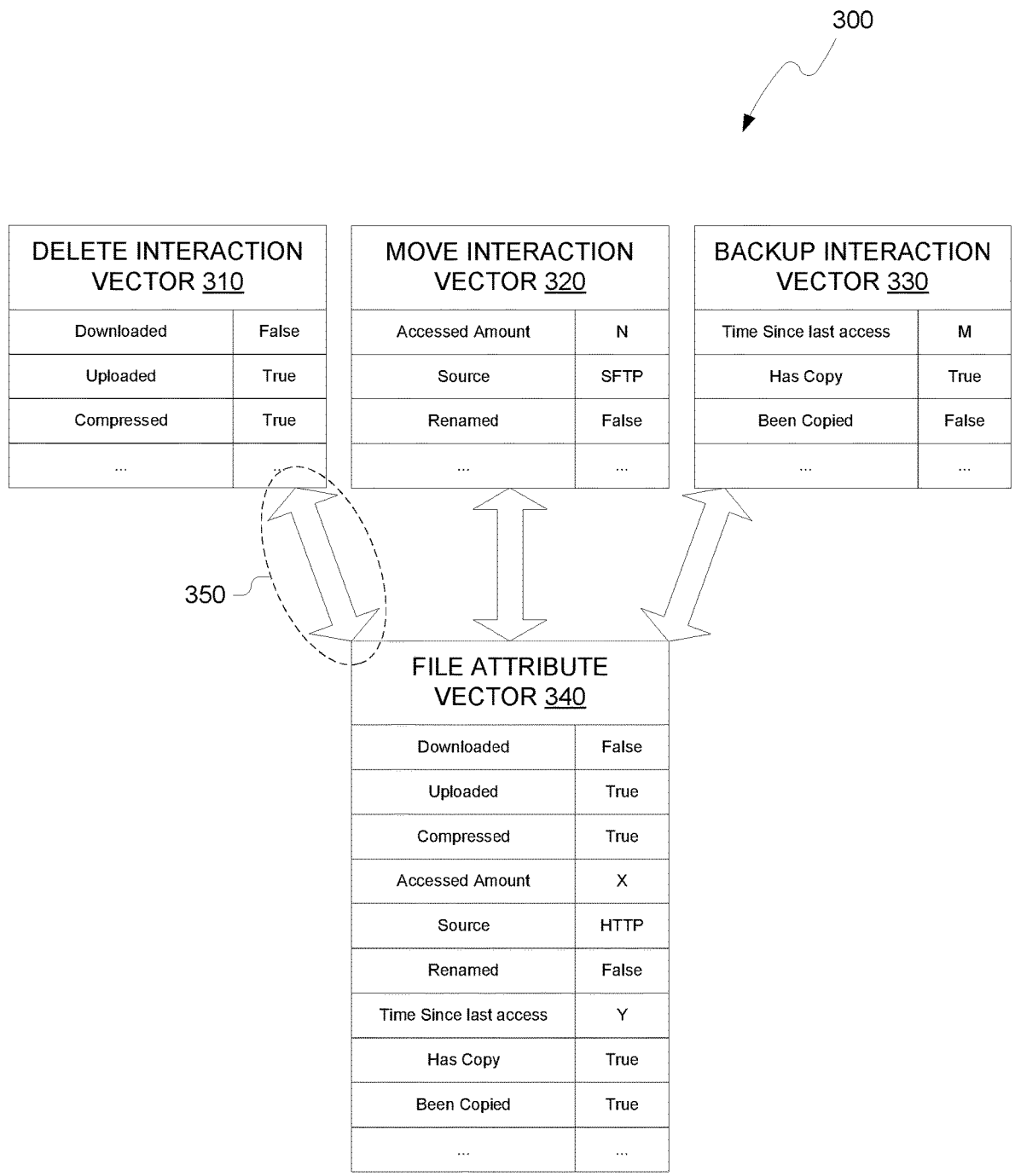
FIG. 3 depicts an example correlation between interaction vectors and a file's attribute vector.

FIG. 3 depicts an example, designated as 300, of a correlation 350 between interaction vectors 310-330 and a file attribute vector 340. As discussed herein, interaction data 118 includes interaction vectors 310-330 that include common attributes of files associated with each specific type of interaction. In this example, file attribute vector 340 are the attributes associated with a file in file data 114. As depicted by correlation 350, file manager program 112 has determined the file associated with the file attribute vector 340 correlates with delete interaction vector 310. As such, file manager program 112 may automatically perform the delete operation. In some scenarios, if the file is marked permanent in attribute data 116, then file manager program 112 requests permission from the user prior to deletion.

Figure 4:
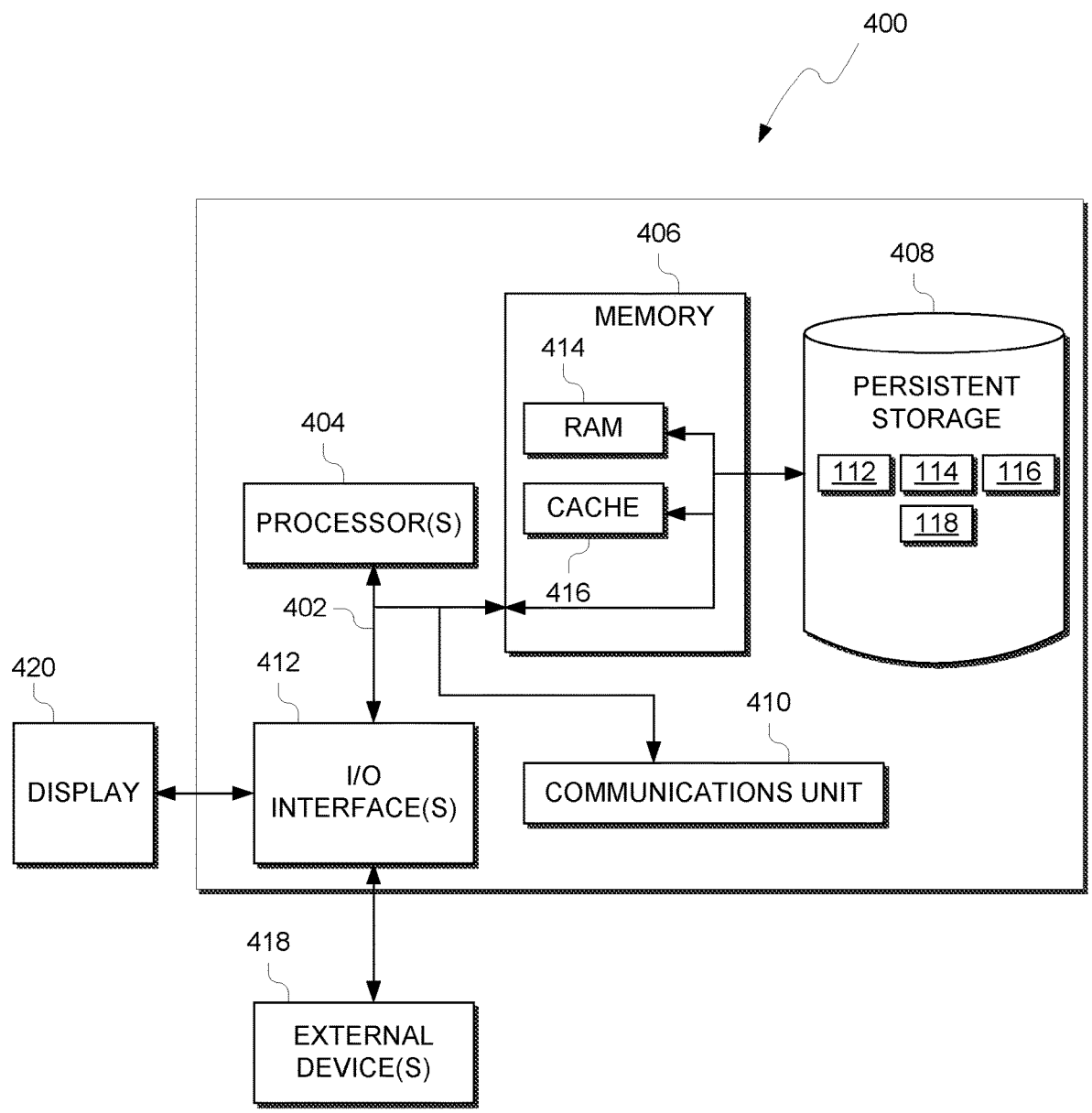
FIG. 4 depicts a block diagram of components of the computing device executing a file manager program, in accordance with an exemplary embodiment of the present invention.

FIG. 4 depicts a block diagram, 400, of components of computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

File manager program 112, file data 114, tracking data 116 and interaction data 118 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. File manager program 112, file data 114, tracking data 116 and interaction data 118 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., file manager program 112, file data 114, tracking data 116 and interaction data 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
identifying a plurality of files to monitor;
generating file attribute vectors associated with the plurality of files, wherein a respective one of the file attribute vectors for a respective one of the plurality of files includes tracking attributes associated with the respective one of the plurality of files;
monitoring user interactions with the plurality of files;

generating prediction vectors for a plurality of file interactions based on the user interactions with the plurality of files;

determining at least one file in the plurality of files with tracking attributes in a said file attribute vector that correlate with at least one prediction vector; and performing an operation on the at least one file, wherein the operation corresponds with the at least one prediction vector.

2. The computer-implemented method of claim 1, wherein the tracking attributes that correlate with at least one prediction vector is determined based on hypothesis testing between an attribute of tracking attributes occurring in a file and an interaction with a file of the same attribute being performed by the user.

3. The computer-implemented method of claim 1, wherein the tracking attributes monitor one or more of the following for the plurality of files: file creation, file associations, file alterations and file access.

4. The computer-implemented method of claim 3, wherein the file creation tracking attributes tracks one or more of the following for the plurality of files: data indicating source programs or commands that created the plurality of files, data indicating if the plurality of files were downloaded or created locally, data indicating what users created the plurality of files, or data indicating where the file was retrieved from.

5. The computer-implemented method of claim 3, wherein the file associations tracking attributes tracks which files in the plurality of files are copies or derivatives of other files in the plurality of files.

6. The computer-implemented method of claim 3, wherein the file alterations tracking attributes tracks one or more of the following for the plurality of files: filename history, compression history, upload history, or links to the other files in the plurality of files.

7. The computer-implemented method of claim 3, wherein the file access tracking attributes tracks one or more of the following for the plurality of files: previous dates or times a file of the plurality of files was interacted with by a user or a frequency of access by the user with the file of the plurality of files.

8. A computer program product comprising:

one or more computer-readable storage media and program instructions stored on the one or more computer-readable storage media, the program instructions comprising:

program instructions to identify a plurality of files to monitor;

program instructions to generate file attribute vectors associated with the plurality of files, wherein a respective one of the file attribute vectors for a respective one of the plurality of files includes tracking attributes associated with one of the plurality of files;

program instructions to monitor user interactions with the plurality of files;

program instructions to generate prediction vectors for a plurality of file interactions based on the user interactions with the plurality of files, wherein a respective one of the prediction vectors for a respective one of the plurality of file interactions includes expected tracking attributes associated with the respective one of the plurality of file interactions;

program instructions to determine at least one file in the plurality of files with tracking attributes in a said file attribute vector that correlate with at least one prediction vector; and program instructions to perform an operation on the at least one file, wherein the operation corresponds with the at least one prediction vector.

9. The computer program product of claim 8, wherein the tracking attributes that correlate with at least one prediction vector is determined based on hypothesis testing between an attribute of tracking attributes occurring in a file and an interaction with a file of the same attribute being performed by the user.

10. The computer program product of claim 8, wherein the tracking attributes monitor one or more of the following for the plurality of files: file creation, file associations, file alterations and file access.

11. The computer program product of claim 10, wherein the file creation tracking attributes tracks one or more of the following for the plurality of files: data indicating source programs or commands that created the plurality of files, data indicating if the plurality of files were downloaded or created locally, data indicating what users created the plurality of files, or data indicating where the file was retrieved from.

12. The computer program product of claim 10, wherein the file associations tracking attributes tracks which files in the plurality of files are copies or derivatives of other files in the plurality of files.

13. The computer program product of claim 10, wherein the file alterations tracking attributes tracks one or more of the following for the plurality of files: filename history, compression history, upload history, or links to the other files in the plurality of files.

14. The computer program product of claim 10, wherein the file access tracking attributes tracks one or more of the following for the plurality of files: previous dates or times a file of the plurality of files was interacted with by a user or a frequency of access by the user with the file of the plurality of files.

15. A computer system comprising:

one or more computer processors;

one or more computer readable storage media; and program instructions stored on the computer readable storage media for execution by at least one of the one or more processors, the program instructions comprising:

program instructions to identify a plurality of files to monitor;

program instructions to generate file attribute vectors associated with the plurality of files, wherein a respective one of the file attribute vectors for a respective one of the plurality of files includes tracking attributes associated with the respective one of the plurality of files;

program instructions to monitor user interactions with the plurality of files;

program instructions to generate prediction vectors for a plurality of file interactions based on the user interactions with the plurality of files;

program instructions to determine at least one file in the plurality of files with tracking attributes in a said file attribute vector that correlate with at least one prediction vector; and program instructions to suggest to the user that the user perform an operation on the at least one file, wherein the operation corresponds with the at least one prediction vector.

16. The computer system of claim 15, wherein the tracking attributes that correlate with at least one prediction vector is determined based on hypothesis testing between an attribute of tracking attributes occurring in a file and an interaction with a file of the same attribute being performed by the user.

17. The computer system of claim 15, wherein the tracking attributes monitor one or more of the following for the plurality of files: file creation, file associations, file alterations and file access.

18. The computer system of claim 15, wherein the file creation tracking attributes tracks one or more of the following for the plurality of files: data indicating source programs or commands that created the plurality of files, data indicating if the plurality of files were downloaded or created locally, data indicating what users created the plurality of files, or data indicating where the file was retrieved from.

19. The computer system of claim 15, wherein the file associations tracking attributes tracks which files in the plurality of files are copies or derivatives of other files in the plurality of files.

20. The computer system of claim 15, wherein the file alterations tracking attributes tracks one or more of the following for the plurality of files: filename history, compression history, upload history, or links to the other files in the plurality of files.

* * * * *